United States Patent
Kasami

(10) Patent No.: US 10,801,619 B2
(45) Date of Patent: Oct. 13, 2020

(54) PARKING LOCK DEVICE

(71) Applicant: SUBARU CORPORATION, Tokyo (JP)

(72) Inventor: Seiya Kasami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/447,461

(22) Filed: Jun. 20, 2019

(65) Prior Publication Data

US 2020/0096101 A1    Mar. 26, 2020

(30) Foreign Application Priority Data

Sep. 21, 2018  (JP) .................. 2018-177119

(51) Int. Cl.

| F16H 63/34 | (2006.01) |
|---|---|
| F16H 59/10 | (2006.01) |
| B60W 10/06 | (2006.01) |
| B60W 10/18 | (2012.01) |
| F16D 65/16 | (2006.01) |
| B60T 1/00 | (2006.01) |
| B60T 7/12 | (2006.01) |
| F16D 63/00 | (2006.01) |

(Continued)

(52) U.S. Cl.
CPC .......... *F16H 63/3483* (2013.01); *B60T 1/005* (2013.01); *B60T 7/12* (2013.01);
(Continued)

(58) Field of Classification Search
None
See application file for complete search history.

(56) References Cited

U.S. PATENT DOCUMENTS

| 5,934,395 A * | 8/1999 | Koide ............. B60W 20/15 180/65.235 |
|---|---|---|
| 2007/0297577 A1* | 12/2007 | Wyss ............. H04M 3/42221 379/67.1 |

(Continued)

FOREIGN PATENT DOCUMENTS

| JP | 4-290667 A | 10/1992 |
|---|---|---|
| JP | 10-184881 A | 7/1998 |

(Continued)

OTHER PUBLICATIONS

Notification of Reasons for Refusal issued in corresponding Japanese, with Patent Application No. 2018-177119 dated Feb. 12, 2020, with machine translation.

*Primary Examiner* — Colby M Hansen
(74) *Attorney, Agent, or Firm* — Troutman Pepper Hamilton Sanders LLP

(57) ABSTRACT

A parking lock device includes a parking mechanism, a lock state switching member, a selector, a gradient detector, a switching controller, and an engine speed controller. The lock state switching member locks a parking gear when supply of hydraulic pressure is stopped. When hydraulic pressure is supplied, the lock state switching member releases the lock of the parking gear. The selector receives operation to select a shift range. The gradient detector detects a gradient of a road surface. When a parking range is selected, the switching controller stops supplying the hydraulic pressure to the lock state switching member. When another shift range is selected, the switching controller supplies the hydraulic pressure to the lock state switching member. When the parking range is selected and the gradient of the road surface is equal to or larger than a predetermined value, the engine speed controller increases an engine speed.

7 Claims, 2 Drawing Sheets

(51) Int. Cl.
  *B60W 30/18* (2012.01)
  *F16D 121/06* (2012.01)
(52) U.S. Cl.
  CPC .......... *B60W 10/06* (2013.01); *B60W 10/182* (2013.01); *B60W 30/18109* (2013.01); *F16D 63/006* (2013.01); *F16D 65/16* (2013.01); *F16H 59/105* (2013.01); *B60W 2552/15* (2020.02); *B60W 2710/0644* (2013.01); *B60W 2710/188* (2013.01); *F16D 2121/06* (2013.01)

(56) References Cited

U.S. PATENT DOCUMENTS

| | | | |
|---|---|---|---|
| 2009/0000411 A1 | 1/2009 | Nakayama et al. | |
| 2012/0123653 A1* | 5/2012 | Kimura | B60W 10/06 |
| | | | 701/54 |
| 2012/0298462 A1 | 11/2012 | Wakayama et al. | |
| 2014/0102251 A1* | 4/2014 | Corsetti | B60W 10/182 |
| | | | 74/665 A |
| 2015/0337953 A1 | 11/2015 | Kasuya et al. | |
| 2016/0159359 A1 | 6/2016 | Kasahara et al. | |
| 2017/0080943 A1* | 3/2017 | Feiner | B60W 10/06 |
| 2017/0297577 A1* | 10/2017 | Tsuji | B60W 10/182 |

FOREIGN PATENT DOCUMENTS

| | | |
|---|---|---|
| JP | 2009-8153 A | 1/2009 |
| JP | 2011-185379 A | 9/2011 |
| JP | 2016-168888 A | 9/2016 |
| WO | 2014/119515 A1 | 8/2014 |
| WO | 2015/012104 A1 | 1/2015 |

* cited by examiner

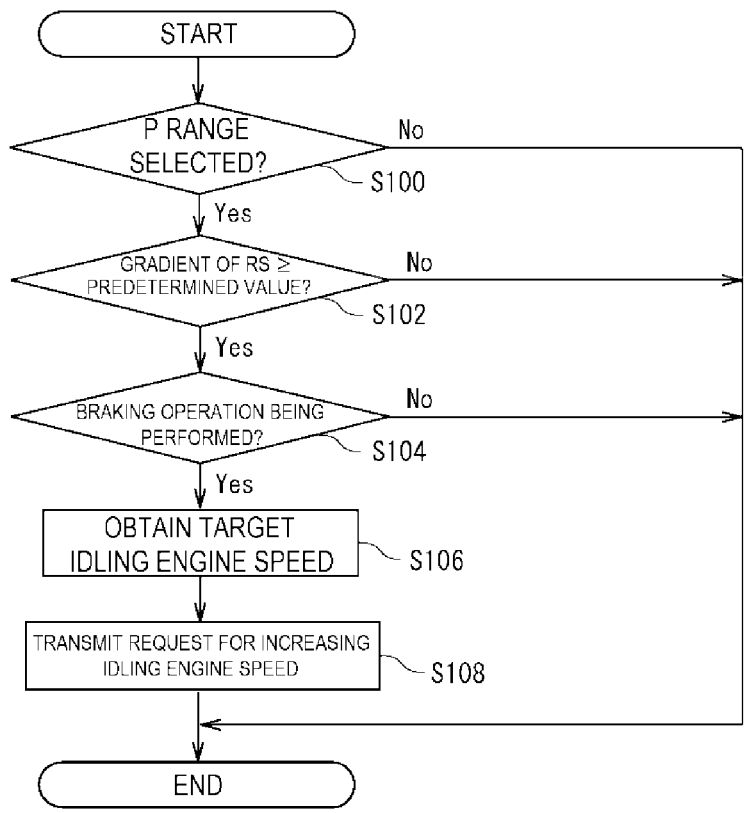

PARKING LOCK DEVICE

CROSS-REFERENCE TO RELATED APPLICATIONS

The present application claims priority from Japanese Patent Application No. 2018-177119 filed on Sep. 21, 2018, the entire contents of which are hereby incorporated by reference.

BACKGROUND

The disclosure relates to parking lock devices and, in particular, to a parking lock device of an automatic transmission employing a hydraulic shift-by-wire mechanism.

An automatic transmission of the related art includes a parking lock mechanism to lock a parking gear engaged with an output shaft of the automatic transmission when a parking (P) range is selected. Recently, automatic transmissions including shift-by-wire (SBW) mechanisms have been put into practical use. The SBW mechanism detects a shift range selected by a driver using an element such as a switch, and drives a hydraulic actuator, for example, based on a result of the detection to switch a shift range of the automatic transmission.

Japanese Unexamined Patent Application Publication (JP-A) No. 2016-168888 discloses a parking device including a hydraulic actuator configured to switch between a parking locked state and a parking-lock released state by displacing a piston rod. More specifically, in the parking device disclosed in JP-A No. 2016-168888, the hydraulic actuator includes the piston rod, a piston secured to the piston rod, and a return spring to urge the piston rod and the piston toward a parking locked side. In this parking device, hydraulic pressure against urging force of the return spring is supplied to the hydraulic actuator to displace the piston rod and the piston to a parking-lock released side to release parking lock.

SUMMARY

An aspect of the disclosure provides a parking lock device including a parking mechanism, a lock state switching member, a selector, a gradient detector, a switching controller, and an engine speed controller. The parking mechanism includes a parking gear, and a parking pawl configured to engage with the parking gear to lock the parking gear to change an automatic transmission into a parking state. The lock state switching member is configured to lock the parking gear when supply of hydraulic pressure increased by an oil pump is stopped. The lock state switching member is configured to, when hydraulic pressure is supplied, release the lock of the parking gear by driving the parking pawl with pressing force generated by the hydraulic pressure. The selector is configured to receive operation to select a shift range of the automatic transmission. The gradient detector is configured to detect a gradient of a road surface. The switching controller is configured to, when a parking range is selected, stop supplying the hydraulic pressure to the lock state switching member. The switching controller is configured to, when a shift range other than the parking range is selected, supply the hydraulic pressure to the lock state switching member. The engine speed controller is configured to, when the parking range is selected and the gradient of the road surface is equal to or larger than a predetermined value, increase an engine speed of an engine configured to drive the oil pump.

An aspect of the disclosure provides a parking lock device including a parking mechanism, a lock state switching member, a selector, a gradient detector, and circuitry. The parking mechanism includes a parking gear, and a parking pawl configured to engage with the parking gear to lock the parking gear to change an automatic transmission into a parking state. The lock state switching member is configured to lock the parking gear when supply of hydraulic pressure increased by an oil pump is stopped. The lock state switching member is configured to, when hydraulic pressure is supplied, release the lock of the parking gear by driving the parking pawl with pressing force generated by the hydraulic pressure. The selector is configured to receive operation to select a shift range of the automatic transmission. The gradient detector is configured to detect a gradient of a road surface. The circuitry is configured to, when a parking range is selected, stop supplying the hydraulic pressure to the lock state switching member. The circuitry is configured to, when a shift range other than the parking range is selected, supply the hydraulic pressure to the lock state switching member. The circuitry is configured to, when the parking range is selected and the gradient of the road surface is equal to or larger than a predetermined value, increase an engine speed of an engine configured to drive the oil pump.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 is a flowchart of a procedure of parking lock processing performed by the parking lock device according to the embodiment.

FIG. 3 is a table illustrating a target idling engine speed map as an example.

DETAILED DESCRIPTION

Figure 1:
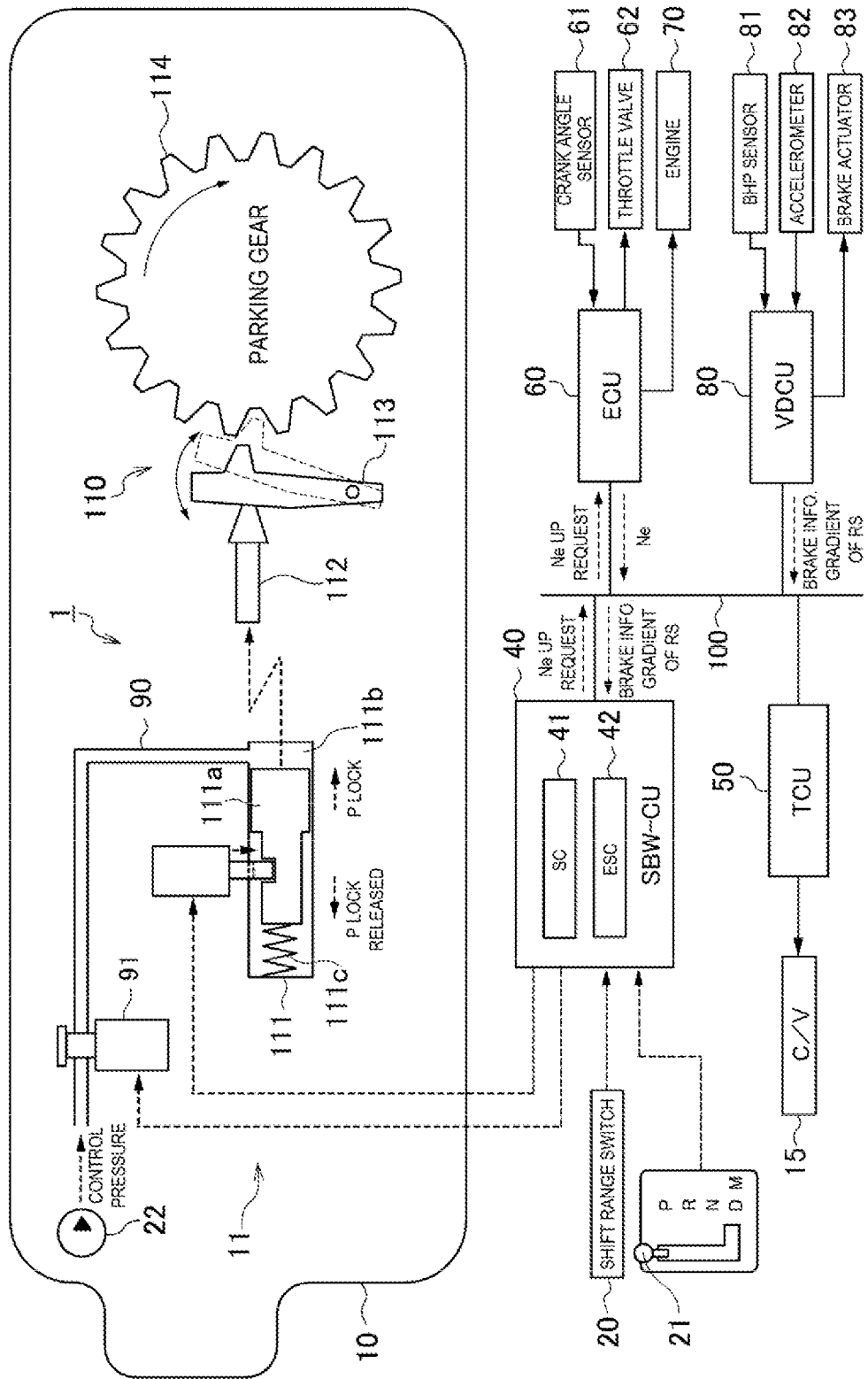
FIG. 1 is a block diagram illustrating the configuration of a parking lock device according to an embodiment.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. In order to release parking lock on a slope (an uphill or downhill slope), for example, a load in accordance with a gradient of a road surface and a weight of a vehicle is applied to tooth surfaces of a parking gear and a parking pawl engaging with each other. Consequently, larger thrust (hydraulic pressure) is required for displacing a piston rod and a piston toward a lock released side. Normally, a discharge amount (hydraulic pressure) of an oil pump depends upon a rotational speed (hereinafter may be referred to as an "engine speed") of an engine to drive the oil pump, and the discharge amount is decreased (the hydraulic pressure is lowered) in the case of an idling engine speed. Therefore, to reliably release the parking lock on a slope (an uphill or downhill slope) while the engine is idling, a pressure-receiving area (a pressure-receiving diameter) of the piston which receives the hydraulic pressure is to be increased. This unfortunately enlarges a parking lock mechanism.

It is desirable to provide a parking lock device capable of securing parking lock releasing performance on a slope (an uphill or downhill slope) without increasing a parking lock mechanism in size.

Referring first to FIG. 1, the configuration of a parking lock device 1 according to the embodiment will be described. FIG. 1 is a block diagram illustrating the configuration of the parking lock device 1.

An automatic transmission 10 to which the parking lock device 1 is applied includes, for example, a torque converter having a lock-up clutch function and a torque amplifying function, and a transmission unit with a transmission gear train and a control valve (an example of a hydraulic pressure mechanism). Examples of the automatic transmission 10 include a stepped automatic transmission and a continuously variable transmission (CVT) capable of automatic gear change using the control valve. In the embodiment, the automatic transmission 10 includes the CVT. The automatic transmission 10 is coupled to the output shaft of an engine 70 and converts and outputs driving force from the engine 70 (although FIG. 1 schematically illustrates the automatic transmission 10 separate from the engine 70).

The automatic transmission 10 includes a hydraulic shift-by-wire actuator (hereinafter referred to as a "SBW actuator") 11. Drive of the SBW actuator 11 is controlled by a shift-by-wire control unit (hereinafter referred to as "SBW-CU") 40. The SBW actuator 11 controls hydraulic pressure in accordance with a control signal (a drive signal) from the SBW-CU 40 so as to switch a shift range of the automatic transmission 10.

At a center console of a vehicle, for example, a shift lever 21 is provided. The shift lever 21 receives shift operation (operation to select a shift range of the automatic transmission 10) by a driver. The shift lever 21 includes a shift range switch 20 coupled to the shift lever 21 and movable in conjunction with the shift lever 21. The shift range switch 20 detects a selected position of the shift lever 21 and output selection information in accordance with the selected position. The shift range switch 20 is connected with the SBW-CU 40 (or may be connected with a TCU 50 which will be described later) in such a manner that the SBW-CU 40 reads the selected position of the shift lever 21 (the selection information) that has been detected. The SBW-CU 40 switches a shift range of the automatic transmission 10 based on the selection information. It should be noted that the shift lever 21 is capable of selectively switching, for example, among four shift ranges, that is, a parking range (a P range), a backward travel range (a reverse (R) range), a neutral range (an N range), and a forward travel range (a drive (D) range). In one embodiment, the shift lever 21 and the shift switch 20 may serve as a "selector".

The automatic transmission 10 also includes a parking mechanism 110 that locks rotation inside the automatic transmission 10 so that the wheels do not rotate when the P range is selected. The parking mechanism 110 includes a parking gear 114 and a parking pawl 113. The parking pawl 113 engages with the parking gear 114 to lock the parking gear 114 and bring the automatic transmission 10 into a parking state.

More specifically, a parking rod 112 is axially movably coupled to an output shaft of a parking piston 111 that constitutes the SBW actuator 11 driven by the SBW-CU 40. The parking gear 114 is spline-fitted to an output shaft of the automatic transmission 10. The parking pawl 113 is swingable to engage with the parking gear 114.

When the P range is selected, a piston 111a of the parking piston 111 is displaced to the right in FIG. 1 to make the parking rod 112 advance axially. Then, the parking pawl 113 is pressed from behind by the parking rod 112 and swings to engage with the parking gear 114. Thus, rotation of the automatic transmission 10 is locked.

An oil passage 90 through which oil is supplied is coupled to an end of the parking piston 111. The parking piston 111 accommodates the piston (a spool valve) 111a axially slidable inside. A spring 111c is disposed on another end of the piston 111a. The piston 111a is driven axially in accordance with balance between pressing force generated by hydraulic pressure (hydraulic pressure multiplied by a pressure-receiving area) and spring force (urging force) of the spring 111c. As a result, the parking rod 112 and the parking pawl 113 are driven.

In the parking piston 111, when the spring force of the spring 111c is larger than the pressing force generated by the hydraulic pressure in an oil chamber 111b (that is, when supply of the hydraulic pressure is stopped), the piston 111a is displaced (slid) to the right in FIG. 1 to swing the parking pawl 113 and lock the parking gear 114. Consequently, when supply of the hydraulic pressure to the parking piston 111 is stopped, the parking pawl 113 is driven (swung) to lock the parking gear 114 (that is, bring the automatic transmission 10 into the parking state).

In the parking piston 111, when the spring force of the spring 111c is less than the pressing force generated by the hydraulic pressure in the oil chamber 111b (that is, when the hydraulic pressure is supplied), the piston 111a is displaced (slid) to the left in FIG. 1 to swing the parking pawl 113 to release lock of the parking gear 114. Thus, when the hydraulic pressure is supplied to the parking piston 111, driving (swinging) of the parking pawl 113 is stopped to release lock of the parking gear 114 (that is, bring the automatic transmission 10 into a non-parking state). In one embodiment, the parking piston 111 may serve as a "lock state switching member".

The oil passage 90 is directly or indirectly coupled to an oil pump 22 driven by the engine 70 to increase the oil in pressure and discharge the oil. An electromagnetic valve 91 is disposed in the oil passage 90. The electromagnetic valve 91 opens and closes the oil passage 90 to supply the hydraulic pressure (the oil) to the parking piston 111 or stop supplying the hydraulic pressure (the oil) to the parking piston 111. The electromagnetic valve 91 is connected to the SBW-CU 40, and drive of the electromagnetic valve 91 is controlled by the SBW-CU 40. That is, the SBW-CU 40 controls opening and closing of the electromagnetic valve 91 to supply the hydraulic pressure to the parking piston 111 or stop supplying the hydraulic pressure to the parking piston 111.

As described above, the SBW-CU 40 is connected to the SBW actuator 11. Via a CAN 100, the SBW-CU 40 is in communicable connect to elements such as a transmission control unit (hereinafter referred to as a "TCU") 50, an engine control unit (hereinafter referred to as an "ECU") 60, and a vehicle dynamic control unit (hereinafter referred to as a "VDCU") 80.

Each of the control units will now be described. First, the TCU 50 controls gear change of the automatic transmission 10. Various sensors disposed in the automatic transmission 10 are connected to the TCU 50. Via the CAN 100, the TCU 50 receives information such as an engine speed and an opening degree of an accelerator pedal which are transmitted from the ECU 60, and information such as a shift range of the automatic transmission 10 transmitted from the SBW-CU 40. The engine speed may be simply referred to as Ne.

Based on the obtained various information including the engine speed, the opening degree of the accelerator pedal, a vehicle speed, and the shift range, the TCU 50 drives a solenoid valve that constitutes the control valve 15 so as to perform gear change control of the automatic transmission 10 and the like. The control valve 15 controls hydraulic pressure for gear change of the automatic transmission 10. More specifically, the control valve 15 uses a spool valve and a solenoid valve (an electromagnetic valve) to move the spool valve so as to open and close an oil passage to supply hydraulic pressure generated by the oil pump 22 to, for example, a drive pulley and a driven pulley. It should be noted that the TCU 50 transmits various information on the automatic transmission 10 to the SBW-CU 40 via the CAN 100.

Based on detection signals input from various sensors, the ECU 60 obtains various information including the engine speed, an intake air amount, an air-fuel ratio of air-fuel mixture, and the opening degree of the accelerator pedal. Based on the obtained various information, the ECU 60 controls actuators such as an injector (a fuel injection amount), an ignition plug (an ignition timing), and an electronically controlled throttle valve 62 (the intake air amount) so as to control the engine 70 comprehensively. A crank angle sensor 61 that detects a rotation position of a crankshaft of the engine 70 is connected with the ECU 60. The ECU 60 calculates the engine speed from an output of the crank angle sensor 61. The ECU 60 transmits the obtained information including the engine speed to the SBW-CU 40 via the CAN 100. The ECU 60 receives a request for increasing the engine speed (for example, a target idling engine speed or a target engine-speed increase amount), described later, from the SBW-CU 40 via the CAN 100. In accordance with the request, the ECU 60 regulates an opening degree of the electronically controlled throttle valve 62 and adjusts factors such as the fuel injection amount and the ignition timing to increase the engine speed (the idling engine speed).

Connected with the VDCU 80 are a brake hydraulic pressure sensor 81 (which may be referred to as a "BHP sensor 81") that detects a master cylinder pressure of a brake actuator 83 and an accelerometer 82 that detects a gradient of a road surface (which may be referred to as the "gradient of RS"). In one embodiment, the brake hydraulic pressure sensor 81 may serve as a "braking operation detector", and the accelerometer 82 may serve as a "gradient detector". The VDCU 80 drives the brake actuator 83 in accordance with an operation amount of a brake pedal to brake the vehicle, and detects vehicle behavior using various sensors (for example, a vehicle speed sensor, a steering angle sensor, an acceleration sensor, and a yaw rate sensor) so that brake control by automatic pressurization and torque control of the engine 70 prevent the vehicle from skidding to secure vehicle stability in turning.

For example, a capacitance sensor that detects an inclination of the vehicle during a stop (that is, the gradient of a road surface) may be used as the accelerometer 82. However, instead of the accelerometer 82, for example, the gradient of the road surface may be detected based on a difference between a corrected acceleration sensor value and a differential value of the vehicle speed. The corrected acceleration sensor value is the sum of a longitudinal acceleration of the vehicle detected by the acceleration sensor and a zero-point learned value. The gradient of the road surface may be estimated based on a driving force calculated from the output torque of the engine 70, the acceleration of the vehicle calculated from (i) the differential value of the vehicle speed and (ii) a preset vehicle weight. The VDCU 80 transmits the obtained information including the braking information (braking operation information), road surface gradient information, and the vehicle speed to the SBW-CU 40 via the CAN 100.

Based on a shift range detected by the shift range switch 20, the engine speed received from the ECU 60, the braking operation information and the road surface gradient information received from the VDCU 80, and various input information received from the TCU 50, the SBW-CU 40 generates and outputs a control signal to drive the SBW actuator 11. Thereby, the SBW-CU 40 switches the shift range of the automatic transmission 10. The SBW-CU 40 has a function of securing the parking lock releasing performance on a slope (an uphill or downhill slope) without increasing the parking lock mechanism 110 in size.

Therefore, the SBW-CU 40 functionally includes a switching controller 41 and an engine speed controller 42. The switching controller 41 may be referred to as a "SC 41", and the engine speed controller 42 may be referred to as an "ESC 42". The SBW-CU 40 includes a microprocessor that executes calculation, an EEPROM that stores programs and the like to cause the microprocessor to execute various processing, a RAM that stores various data such as results of calculation, a backup RAM that retains stored contents by a battery, and an input/output I/F including, for example, a driver circuit that drives the electromagnetic valve 91. In the SBW-CU 40, the microprocessor executes programs stored in elements such as the EEPROM to implement functions of the switching controller 41 and the engine speed controller 42.

Based on a selected shift range, the switching controller 41 controls the supply of hydraulic pressure to the parking piston 111 (that is, controls whether to supply hydraulic pressure to the parking piston 111). More specifically, when a shift range other than the P range is selected (when selection information is output), the switching controller 41 opens the electromagnetic valve 91 to supply hydraulic pressure to the parking piston 111. When the P range is selected (when selection information is output), the switching controller 41 closes the electromagnetic valve 91 to stop supplying the hydraulic pressure to the parking piston 111. In one embodiment, the switching controller 41 may serve as a "switching controller".

The engine speed controller 42 controls the engine speed (the idling engine speed) based on a shift range, the gradient of the road surface, and a braking operation state. In one embodiment, the engine speed controller 42 may serve as an "engine speed controller". More specifically, when the P range is selected, when the gradient of the road surface is equal to or larger than a predetermined value, and when braking operation is being performed (for example, when the brake pedal is being depressed), the engine speed controller 42 transmits the request for increasing the engine speed (the target idling engine speed or the target engine-speed increase amount) to the ECU 60 to increase the engine speed (the idling engine speed) of the engine 70 that drives the oil pump 22. Thus, the engine speed controller 42 makes a request (an "up" request) for increasing the engine speed (the idling engine speed). It should be noted that when the P range is selected and when the gradient of the road surface is equal to or larger than the predetermined value, the engine speed controller 42 may make a request so as to increase the engine speed (the idling engine speed) of the engine 70.

In this case, the engine speed controller 42 sets a request value (the target idling engine speed or the target engine-speed increase amount) to raise the increase amount of the engine speed (that is, to increase the idling engine speed) as the road surface gradient increases. More specifically, the EEPROM of the SBW-CU 40, for example, stores in advance a map (a target idling engine speed map) that provides a relationship between the gradient of the road surface (degrees (°)) and the target idling engine speed or the target engine-speed increase amount (rpm). Based on the obtained gradient of the road surface, the SBW-CU 40 makes a search in the target idling engine speed map and obtains the target idling engine speed or the target engine-speed increase amount.

An example of the target idling engine speed map is illustrated in FIG. 3. In FIG. 3, the horizontal axis (the row) indicates the gradient of the road surface (°). As illustrated in FIG. 3, the target idling engine speed map is set in such a manner as to increase the target idling engine speed or the target engine-speed increase amount (rpm) as the gradient of the road surface increases.

The SBW-CU 40 transmits the obtained request for increasing the engine speed (the obtained target idling engine speed or the obtained target engine-speed increase amount) to the ECU 60 via the CAN 100. As described above, in response to the target idling engine speed or the target engine-speed increase amount (that is, the request for increasing the engine speed), the ECU 60 increases the engine speed (the idling engine speed) in accordance with the received target idling engine speed or the received target engine-speed increase amount.

Referring now to FIG. 2, operation of the parking lock device 1 will be described. FIG. 2 is a flowchart of a procedure of parking lock processing performed by the parking lock device 1. This processing is repeatedly executed mainly by the SBW-CU 40 in a predetermined cycle (for example, every 10 ms).

At step S100, a determination is made as to whether the P range is selected as a shift range of the automatic transmission 10. When the P range is selected, the processing proceeds to step S102. When the P range is not selected (that is, when a shift range other than the P range is selected), the processing ends.

At step S102, a determination is made as to whether the gradient of the road surface is equal to or larger than the predetermined value (that is, whether the vehicle is on an uphill or downhill slope (a slope)). When the road surface gradient is equal to or larger than the predetermined value, the processing proceeds to step S104. When the road surface gradient is less than the predetermined value, the processing ends.

At step S104, a determination is made as to whether the braking operation (brake operation) is being performed. When the braking operation is being performed, the processing proceeds to step S106. When the braking operation is not being performed, the processing ends.

At step S106, the target idling engine speed (or the target engine-speed increase amount) is set in accordance with a magnitude of the gradient of the road surface. More specifically, as described above, a search is made in the target idling engine speed map using, for example, the magnitude of the gradient of the road surface to set the target idling engine speed or the target engine-speed increase amount.

At step S108, in order to increase the engine speed (the idling engine speed) of the engine 70 that drives the oil pump 22, the target idling engine speed or the target engine-speed increase amount is transmitted to the ECU 60 via the CAN 100. That is, a request is made to increase the engine speed (the idling engine speed). As described above, in response to the target idling engine speed or the target engine-speed increase amount (that is, the request for increasing the engine speed), the ECU 60 increases the engine speed (the idling engine speed) in accordance with the received target idling engine speed or the received target engine-speed increase amount.

According to the embodiment, as described above, when the P range is selected, supply of hydraulic pressure to the parking piston 111 is stopped, and when a shift range other than the P range is selected, hydraulic pressure is supplied to the parking piston 111. When the P range is selected and when the gradient of the road surface is equal to or larger than the predetermined value, the engine speed (the idling engine speed) of the engine 70 that drives the oil pump 22 is increased. Consequently, an increase in the engine speed raises a rotational speed of the oil pump 22 to increase a discharge amount (hydraulic pressure) of the oil pump 22. This increases thrust (pressing force) that releases parking lock without increasing the parking lock mechanism 110 in size (without increasing the pressure-receiving area). This makes it possible to secure parking lock releasing performance on a slope (an uphill or downhill slope) without increasing the parking lock mechanism 110 in size.

In particular, according to the embodiment, when the P range is selected, when the gradient of the road surface is equal to or larger than the predetermined value, and when the braking operation is being performed, the engine speed (the idling engine speed) of the engine 70 that drives the oil pump 22 is increased. Therefore, when the braking operation is performed and when releasing of the parking lock is expected, the engine speed is increased. In view of this, the braking operation (the brake operation) required for releasing the parking lock is set as a condition to make the request for increasing the engine speed, so that degradation of actual fuel economy and generation of vibration and noise due to the increase in the engine speed can be reduced to the minimum.

As the gradient of the road surface increases, thrust (hydraulic pressure) to release the parking lock increases. According to the embodiment, as the gradient of the road surface increases, the increase amount of the engine speed is increased (the idling engine speed is increased). Consequently, an increase in the gradient of the road surface raises the rotational speed of the oil pump 22 to increase the discharge amount (the hydraulic pressure) of the oil pump 22. That is, the thrust generated by the hydraulic pressure is increased. Thus, in accordance with the magnitude of the gradient of the road surface, the hydraulic pressure is adjusted to generate an appropriate hydraulic pressure.

Moreover, according to the embodiment, the parking piston 111 includes the oil chamber 111*b* provided at the one end of the piston 111*a*, and the spring 111*c* disposed at the other end of the piston 111*a*. The piston 111*a* is axially displaced in accordance with the balance between the pressing force generated by the hydraulic pressure supplied to the oil chamber 111*b* and the urging force of the spring 111*c* so as to switch a lock state of the parking gear 114. Consequently, the pressing force generated by the hydraulic pressure reliably switches the lock state of the parking gear 114.

The embodiment of the disclosure has been described thus far. It should be noted that the disclosure is not limited to the embodiment described above. Various modifications may be made. For example, a system configuration of the embodiment is merely an example and should not be construed to limit the disclosure. For example, the SBW-CU 40 and the SBW actuator 11 may be permanently affixed to each other. The SBW-CU 40 and the TCU 50 may be provided as a single unit.

Furthermore, making a determination as to the braking operation condition (step S104) described in the embodiment may be omitted. That is, when a result of the determination at step S102 is affirmative, the processing may proceed to step S106.

According to the disclosure, parking lock releasing performance on a slope (an uphill or downhill slope) can be secured without increasing a parking lock mechanism in size.

The invention claimed is:

1. A parking lock device comprising:
   a parking mechanism comprising
      a parking gear, and
      a parking pawl configured to engage with the parking gear to lock the parking gear to change an automatic transmission into a parking state;
   a lock state switching member configured to lock the parking gear when supply of hydraulic pressure increased by an oil pump is stopped, the lock state switching member configured to, when hydraulic pressure is supplied, release the lock of the parking gear by driving the parking pawl with pressing force generated by the hydraulic pressure;
   a selector configured to receive operation to select a shift range of the automatic transmission;
   a gradient detector configured to detect a gradient of a road surface;
   a switching controller configured to, when a parking range is selected, stop supplying the hydraulic pressure to the lock state switching member, the switching controller configured to, when a shift range other than the parking range is selected, supply the hydraulic pressure to the lock state switching member; and
   an engine speed controller configured to, when the parking range is selected and the gradient of the road surface is equal to or larger than a predetermined value, increase an engine speed of an engine configured to drive the oil pump.

2. The parking lock device according to claim 1, further comprising:
   a braking operation detector configured to detect braking operation of a vehicle, wherein
   when the parking range is selected, the gradient of the road surface is equal to or larger than the predetermined value, and the braking operation is being performed, the engine speed controller increases the engine speed of the engine configured to drive the oil pump.

3. The parking lock device according to claim 2, wherein as the gradient of the road surface increases, the engine speed controller increases an amount of increasing the engine speed.

4. The parking lock device according to claim 3, wherein the lock state switching member comprises
   a piston axially movable,
   an oil chamber disposed on a first end of the piston, and
   a spring disposed on a second end of the piston, and
   the lock state switching member is configured to switch a lock state of the parking gear by making the piston axially move in accordance with balance between pressing force generated by hydraulic pressure supplied to the oil chamber and urging force of the spring.

5. The parking lock device according to claim 1, wherein as the gradient of the road surface increases, the engine speed controller increases an amount of increasing the engine speed.

6. The parking lock device according to claim 5, wherein the lock state switching member comprises
   a piston axially movable,
   an oil chamber disposed on a first end of the piston, and
   a spring disposed on a second end of the piston, and
   the lock state switching member is configured to switch a lock state of the parking gear by making the piston axially move in accordance with balance between pressing force generated by hydraulic pressure supplied to the oil chamber and urging force of the spring.

7. A parking lock device comprising:
   a parking mechanism comprising
      a parking gear, and
      a parking pawl configured to engage with the parking gear to lock the parking gear to change an automatic transmission into a parking state;
   a lock state switching member configured to lock the parking gear when supply of hydraulic pressure increased by an oil pump is stopped, the lock state switching member configured to, when hydraulic pressure is supplied, release the lock of the parking gear by driving the parking pawl with pressing force generated by the hydraulic pressure;
   a selector configured to receive operation to select a shift range of the automatic transmission;
   a gradient detector configured to detect a gradient of a road surface; and
   circuitry configured to
      stop, when a parking range is selected, supplying the hydraulic pressure to the lock state switching member,
      supply, when a shift range other than the parking range is selected, the hydraulic pressure to the lock state switching member, and
      increase, when the parking range is selected and the gradient of the road surface is equal to or larger than a predetermined value, an engine speed of an engine configured to drive the oil pump.

* * * * *